No. 779,041. Patented January 3, 1905

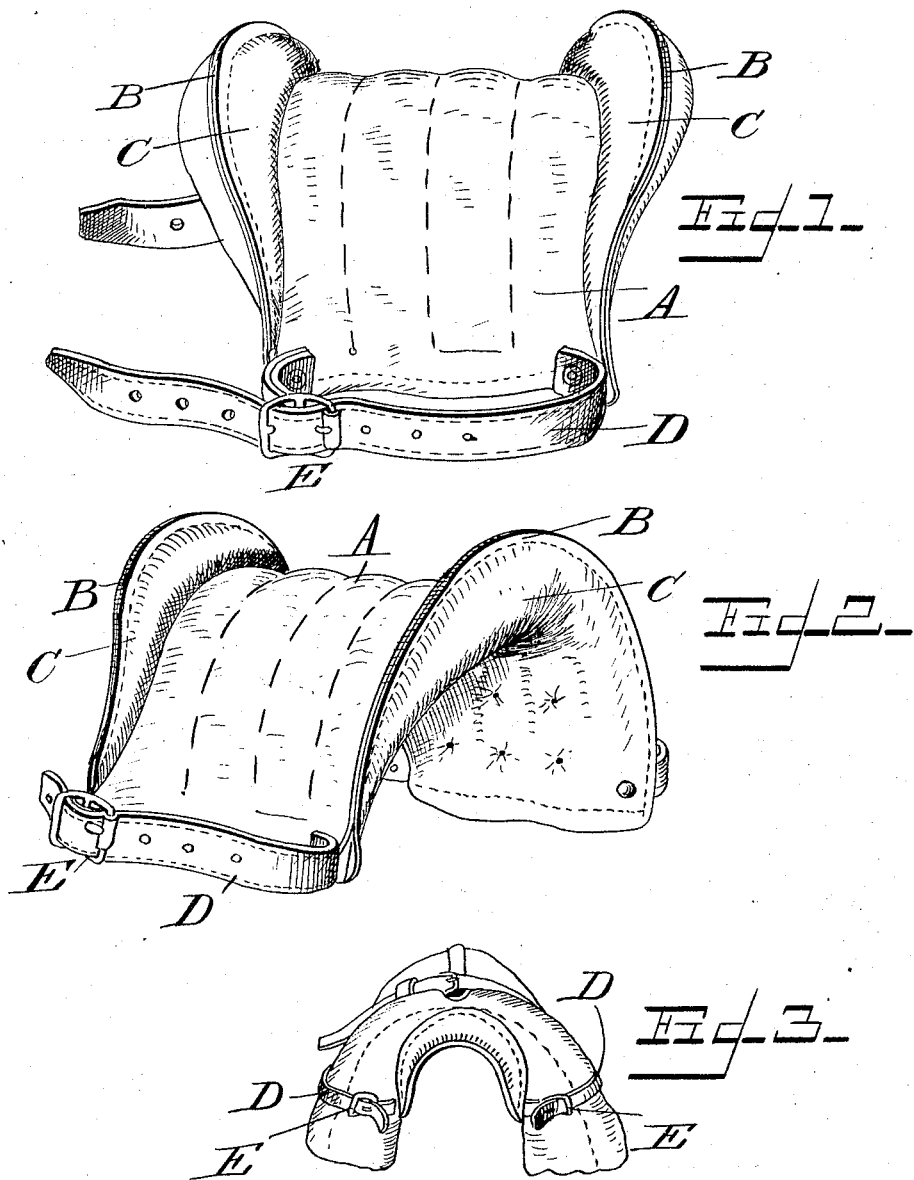

UNITED STATES PATENT OFFICE.

PAUL HOFFMANN, OF DUBUQUE, IOWA.

PAD FOR HORSE-COLLARS.

SPECIFICATION forming part of Letters Patent No. 779,041, dated January 3, 1905.

Application filed October 9, 1903. Serial No. 176,408.

*To all whom it may concern:*

Be it known that I, PAUL HOFFMANN, a citizen of the United States, residing at Dubuque, in the county of Dubuque and State of Iowa, have invented certain new and useful Improvements in Pads for Horse-Collars, of which the following is a specification.

This invention has relation to pads for horse-collars; and among the objects in view is to provide a pad of the character specified adapted to be quickly attached to and detached from a horse-collar, said pad being also adapted to keep the collar from slipping to either side and retain the said collar uniformly in place.

A further object is to provide a pad which will afford a larger bearing-surface to rest upon the neck of the animal, the weight of the collar being distributed over said surface.

A further object is to provide a pad which when applied will protect the neck of the animal from soreness.

The invention consists in the novel construction of the pad, as hereinafter fully described, illustrated in the drawings, and pointed out in the appended claims.

In the accompanying drawings, Figure 1 is a perspective view of the pad looking from one side thereof. Fig. 2 is a perspective view of the pad looking at the same partly from the front and side. Fig. 3 is a side view illustrating the pad applied to an ordinary horse-collar.

A indicates my improved pad, constructed, preferably, in the form of a cushion—that is to say, having a soft or yielding interior lining or filling and outer facings of leather, though it will be understood that I do not restrict myself to any particular materials or manner of constructing the pad whereby to render the same soft and comfortable to the neck of the animal. The pad is constructed in the curved shape adapted to allow it to conform to the curved shape of the upper portion of the side sections of the collar at the point where they fit over the neck of the animal. The pad is provided with the lateral upwardly-projecting flanges B, which are adapted to prevent the pad from slipping and retain the same normally in place. The flanges have extensioned sides C, which latter afford a larger bearing-surface to rest upon the neck of the animal. The flanges B, with their extensioned sides C, are padded, as shown, and the said projections and sides will prevent the body of the pad from rocking, thus protecting the neck of the animal from soreness.

I regard the width of the pad obtained by means of the padded side extensions as being the essential feature of the invention. I am aware that cushion-pads have heretofore been extensively used; but I am not aware that any of these former constructions have embodied the feature of flanges B having the extensioned sides.

For adapting the pad for ready application to and detachment from a collar I provide said pad at the ends with straps and buckles D and E, which straps are adapted to encircle the sections of the collar, as clearly shown in Fig. 3, to thereby firmly hold the pad in place.

What I claim, and desire to secure by Letters Patent, is—

1. A pad for horse-collars comprising a curved body portion adapted to seat upon the neck of the animal and having the lateral upwardly-projecting flanges B, the sides of each of said flanges being padded and the said padded flanges forming extensions which are adapted to rest upon the neck of the animal and increasing the bearing-surface of the pad upon the animal's neck, as and for the purpose specified.

2. A pad for horse-collars comprising a curved body portion adapted to seat upon the neck of the animal and having lateral upwardly-projecting flanges B, the sides of each of said flanges being padded and the said padded flanges forming extensions which are adapted to rest upon the neck of the animal and increasing the bearing-surface of the pad upon the animal's neck, and in combination with attaching-strips secured to the ends of the body portion, as specified.

In testimony whereof I affix my signature in presence of two witnesses.

PAUL HOFFMANN.

Witnesses:
ALEX. SIMPLOT,
THOS. WITTER.